US011738290B2

(12) United States Patent
Beaupre et al.

(10) Patent No.: US 11,738,290 B2
(45) Date of Patent: Aug. 29, 2023

(54) DECANTING BACKWASH RECEIVER

(71) Applicant: Mott Corporation, Farmington, CT (US)

(72) Inventors: Richard Beaupre, Enfield, CT (US); Patrick Stephen Hill, Vernon, CT (US)

(73) Assignee: MOTT CORPORATION, Farmington, CT (US)

( * ) Notice: Subject to any disclaimer, the term of this patent is extended or adjusted under 35 U.S.C. 154(b) by 0 days.

(21) Appl. No.: 17/781,811

(22) PCT Filed: Dec. 3, 2020

(86) PCT No.: PCT/US2020/063003
§ 371 (c)(1),
(2) Date: Jun. 2, 2022

(87) PCT Pub. No.: WO2021/113438
PCT Pub. Date: Jun. 10, 2021

(65) Prior Publication Data
US 2023/0001331 A1    Jan. 5, 2023

Related U.S. Application Data

(60) Provisional application No. 62/943,462, filed on Dec. 4, 2019.

(51) Int. Cl.
*B01D 21/02* (2006.01)
*B01D 21/00* (2006.01)
(Continued)

(52) U.S. Cl.
CPC ..... *B01D 21/0012* (2013.01); *B01D 21/2444* (2013.01); *B01D 24/4631* (2013.01); *B01D 29/66* (2013.01); *B01D 2201/08* (2013.01)

(58) Field of Classification Search
CPC .... B01D 21/0012; B01D 21/02; B01D 21/10; B01D 21/2444; B01D 21/245; B01D 24/4631; B01D 29/66; B01D 2201/08
(Continued)

(56) References Cited

U.S. PATENT DOCUMENTS 660,498 A * 10/1900 Fleming ................. B01D 37/00
                                                      210/299
1,063,754 A *  6/1913 Weiss .................... B01D 21/02
                                                      210/534
(Continued)

FOREIGN PATENT DOCUMENTS

DE        102006010842 A1    9/2007

OTHER PUBLICATIONS

International Search Report for International Application No. PCT/US2020/063003; International Filing Date Dec. 3, 2020; dated Feb. 26, 2021; 3 pages.
(Continued)

*Primary Examiner* — Christopher Upton
(74) *Attorney, Agent, or Firm* — CANTOR COLBURN LLP

(57) ABSTRACT

Disclosed herein are decanting backwash receiver assemblies, and related methods of fabrication and use. The present disclosure provides improved decanting backwash receiver assemblies for decanting of input feeds, and improved systems/methods for utilizing and fabricating the decanting backwash receiver assemblies. The present disclosure provides decanting backwash receiver assemblies utilizing porous media insert members and/or porous media surfaces for the decanting of input feeds. Exemplary decanting backwash receiver assemblies are configured and dimensioned to receive a filter backwash surge flow of slurry (e.g., solids and liquid mixture), and provide for settling of the
(Continued)

solids from flow 11, and provide for decanting of a liquid layer above the settled solids, and optionally provide for de wetting the settled solids, and provide for discharge of the settled solids (e.g., liquid wetted) from the bottom of the assemblies.

20 Claims, 3 Drawing Sheets

(51) Int. Cl.
    *B01D 21/24*     (2006.01)
    *B01D 24/46*     (2006.01)
    *B01D 29/66*     (2006.01)

(58) Field of Classification Search
    USPC ....... 210/791, 793, 798, 800, 803, 275, 299,
                     210/312, 313, 411, 532.1, 534, 535, 540
    See application file for complete search history.

(56) References Cited

U.S. PATENT DOCUMENTS

| | | | | |
|---|---|---|---|---|
| 2,580,012 A * | 12/1951 | Gazda | ................... | B01D 35/02 |
| | | | | 210/532.1 |
| 2,780,359 A * | 2/1957 | Hellmann, Jr. | ........ | B01D 29/00 |
| | | | | 210/312 |
| 3,552,573 A * | 1/1971 | Mail | ................... | B01D 24/4631 |
| | | | | 210/275 |
| 3,616,925 A * | 11/1971 | Tolman | ................... | B01D 21/00 |
| | | | | 210/534 |
| 3,846,304 A * | 11/1974 | Garbo | ................ | B01D 24/4631 |
| | | | | 210/794 |
| 4,780,219 A * | 10/1988 | Witek | ................ | B01D 24/4631 |
| | | | | 210/795 |
| 5,036,882 A | 8/1991 | Norcross et al. | | |
| 5,346,629 A * | 9/1994 | Wuller | ............... | B01D 21/0012 |
| | | | | 210/791 |
| 5,464,543 A | 11/1995 | Moore | | |
| 6,193,643 B1 | 2/2001 | Larsson | | |
| 7,122,118 B2 * | 10/2006 | Walker | ............... | B01D 21/2444 |
| | | | | 210/534 |
| 2005/0121382 A1 | 6/2005 | Walton et al. | | |
| 2006/0163176 A1 | 7/2006 | Delves et al. | | |
| 2013/0168331 A1* | 7/2013 | Beggs | ................ | B01D 24/4631 |
| | | | | 210/793 |
| 2014/0001128 A1* | 1/2014 | Mullis | .................... | B01D 35/02 |
| | | | | 210/793 |

OTHER PUBLICATIONS

Written Opinion for International Application No. PCT/US2020/063003; International Filing Date Dec. 3, 2020; dated Feb. 26, 2021; 9 pages.

\* cited by examiner

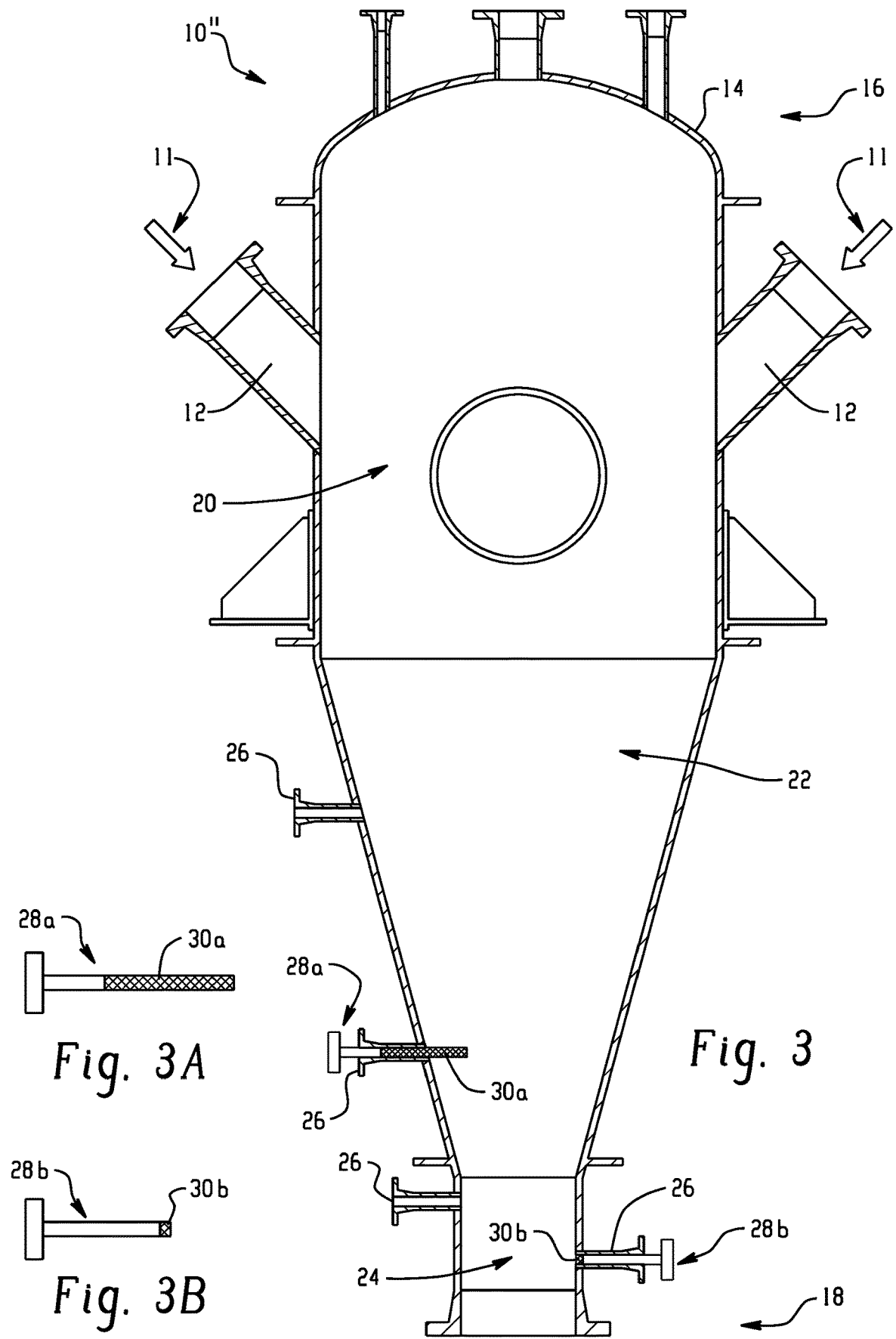

DECANTING BACKWASH RECEIVER

CROSS REFERENCE TO RELATED APPLICATIONS

The present application is a National Stage application of PCT/US2020/063003, filed Dec. 3, 2020, which claims priority benefit to a provisional application which was filed on Dec. 4, 2019, and assigned Ser. No. 62/943,462, both of which are hereby incorporated by reference in their entireties herein.

FIELD OF THE DISCLOSURE

The present disclosure relates to decanting backwash receiver assemblies for decanting of input feeds and systems/methods for utilizing and fabricating the decanting backwash receiver assemblies and, more particularly, to decanting backwash receiver assemblies utilizing porous media insert members and/or porous media surfaces for the decanting of input feeds.

BACKGROUND OF THE DISCLOSURE

In general, there are numerous applications for structures and assemblies for decanting of input feeds.

An interest exists for improved systems and methods for decanting of input feeds.

These and other inefficiencies and opportunities for improvement are addressed and/or overcome by the assemblies, systems and methods of the present disclosure.

BRIEF SUMMARY OF THE DISCLOSURE

The present disclosure provides advantageous decanting backwash receiver assemblies for decanting of input feeds, and improved systems/methods for utilizing and fabricating the decanting backwash receiver assemblies. More particularly, the present disclosure provides decanting backwash receiver assemblies utilizing porous media insert members and/or porous media surfaces for the decanting of input feeds.

The present disclosure provides for a decanting backwash receiver assembly including a vessel housing that extends from a first end to a second end, the vessel housing having an upper section, a middle section and a lower section; one or more inlets associated with the vessel housing, each inlet configured to accept and introduce an input feed to the vessel housing; wherein the upper section is sized to provide volume capacity to receive an instantaneous surge volume of input feed from a filter backwash operation; wherein the middle section of the vessel housing extends from a first interior position to a second interior position, the first interior position positioned proximal to a bottom end of the upper section, and the second interior position positioned proximal to a top end of the lower section of the vessel housing; wherein the middle section includes a tapered cone shape that extends and tapers from the first interior position to the second interior position, the tapered cone shape of middle section thereby allowing for collection and gravity settling of solids from the input feed; and wherein the lower section allows for collection of settled solids from the input feed.

The present disclosure provides for a method for operating a decanting backwash receiver assembly including providing a vessel housing that extends from a first end to a second end, the vessel housing having an upper section, a middle section, a lower section, and one or more inlets; introducing an input feed to the upper section of the vessel housing via the one or more inlets, the input feed an instantaneous surge volume from a filter backwash operation; wherein the middle section of the vessel housing extends from a first interior position to a second interior position, the first interior position positioned proximal to a bottom end of the upper section, and the second interior position positioned proximal to a top end of the lower section of the vessel housing; wherein the middle section includes a tapered cone shape that extends and tapers from the first interior position to the second interior position, the tapered cone shape of middle section thereby allowing for collection and gravity settling of solids from the input feed; and wherein the lower section allows for collection of settled solids from the input feed.

The above described and other features are exemplified by the following figures and detailed description.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are exemplary embodiments wherein the like elements are numbered alike.

Features and aspects of embodiments are described below with reference to the accompanying drawings, in which elements are not necessarily depicted to scale.

Figure 1:
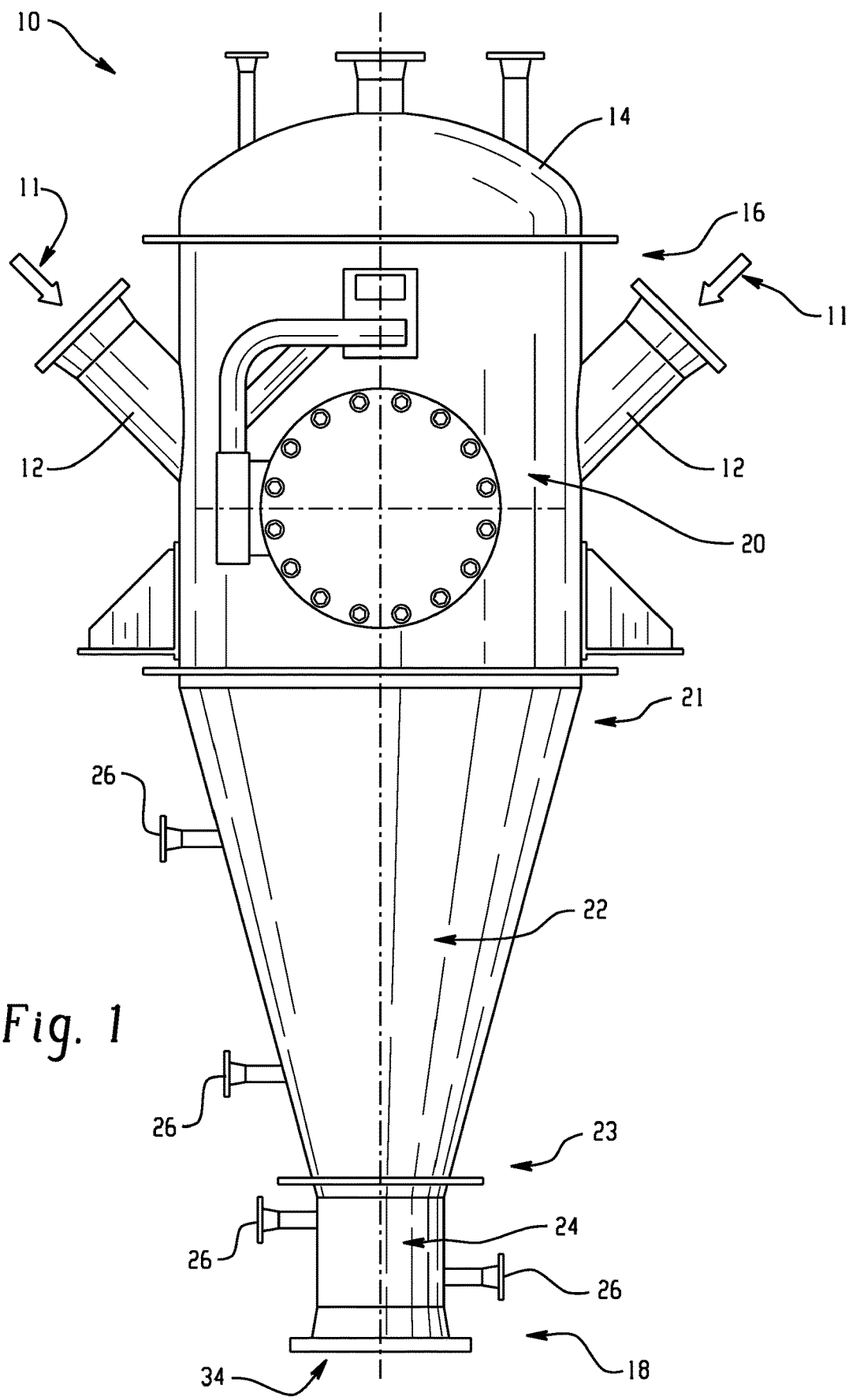

Exemplary embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIG. 1 is a depiction of an exemplary decanting backwash receiver assembly according to the present disclosure.

Figure 2:
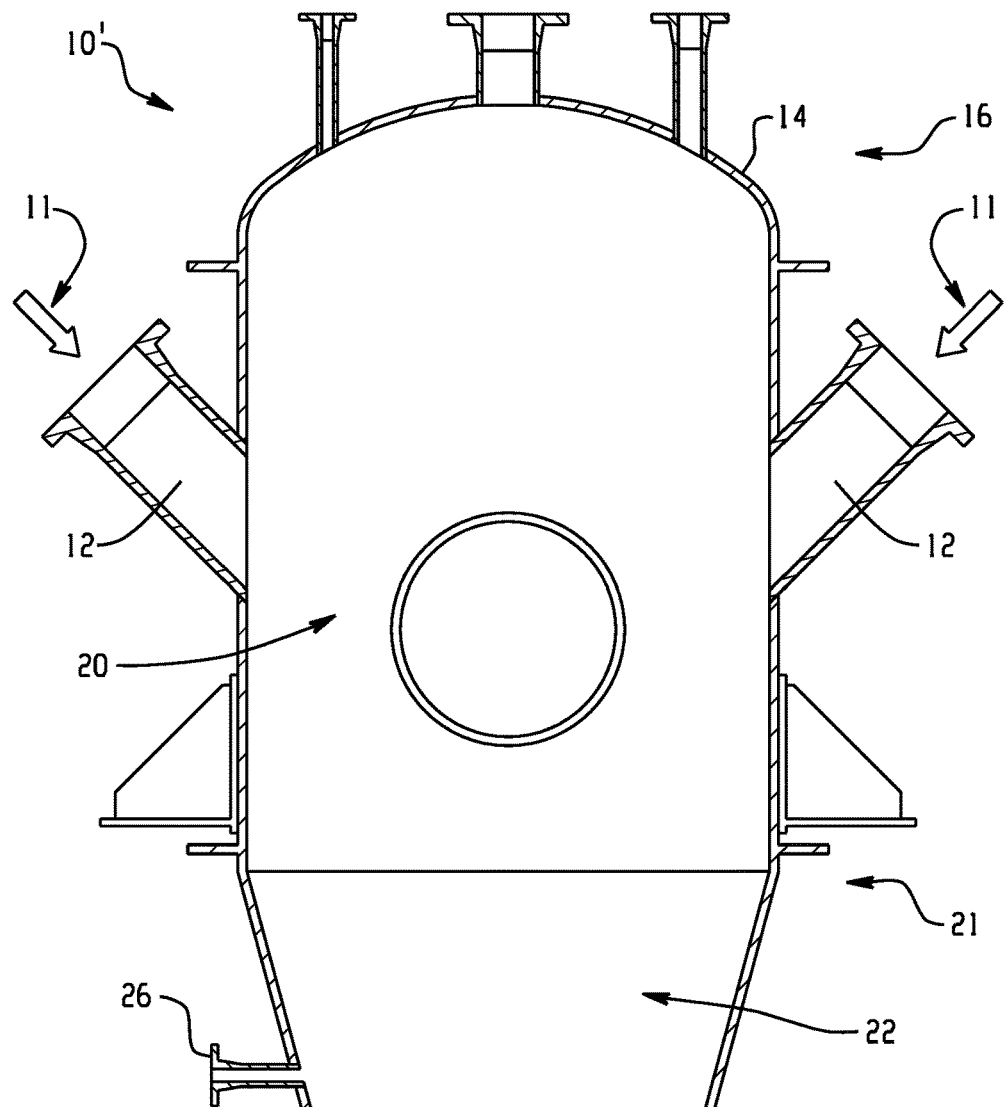

FIG. 2 is a cross-sectional view of an exemplary decanting backwash receiver assembly according to the present disclosure.

FIG. 3 is a cross-sectional view of another exemplary decanting backwash receiver assembly according to the present disclosure.

FIGS. 3A and 3B are views of exemplary insert members.

DETAILED DESCRIPTION OF THE DISCLOSURE

The exemplary embodiments disclosed herein are illustrative of advantageous decanting backwash receiver assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary decanting backwash receiver assemblies and associated processes/techniques of assembly and use are not to be interpreted as limiting, but merely as the basis for teaching one skilled in the art how to make and use the advantageous decanting backwash receiver assemblies and/or alternative decanting backwash receiver assemblies of the present disclosure.

The present disclosure provides advantageous decanting backwash receiver assemblies for decanting of input feeds, and improved systems/methods for utilizing and fabricating the decanting backwash receiver assemblies.

More particularly, the present disclosure provides decanting backwash receiver assemblies utilizing porous media insert members and/or porous media surfaces for the decanting of input feeds.

Referring now to the drawings, like parts are marked throughout the specification and drawings with the same reference numerals, respectively. Drawing figures are not necessarily to scale and in certain views, parts may have been exaggerated for purposes of clarity.

FIG. 1 illustrates an exemplary design and configuration of an embodiment of a decanting backwash receiver assembly 10 for input feeds 11 (e.g., a filter backwash surge flow 11 of slurry, the slurry being a solids and liquid mixture; an input feed 11 of a two-phase mixture). As such and as discussed further below, decanting backwash receiver assembly 10 is configured and dimensioned to be utilized for decanting of input feeds 11. The input feed 11 can enter assembly 10 via one or more inlets 12 of assembly 10 (or of assembly 10' or of assembly 10", discussed below).

In exemplary embodiments, assembly 10 (or assembly 10' or 10") is configured and dimensioned to receive a filter backwash surge flow 11 of slurry (e.g., solids and liquid mixture), and assembly 10 provides for settling of the solids from flow 11, and provides for decanting of a liquid layer above the settled solids, and optionally provides for de-wetting the settled solids, and provides for discharge of the settled solids (e.g., liquid wetted) from the bottom of the assembly 10 (e.g., to a container, such as a drum, cart, tote, hopper, etc.).

Exemplary assembly 10 (or assembly 10' or 10") is also configured and dimensioned to receive a "wet cake" filter backwash surge flow 11. In general, the "wet cake" surge flow 11 results when some portion of the liquid in the filter is removed before the filter backwash is performed. The "wet cake" may contain a lower weight percent ("wt %") or a higher wt % of solids compared to non-wet cake filter backwash surge flow 11 to the assembly 10.

As shown in FIGS. 1-3, assembly 10, 10', 10" includes a vessel housing 14 that extends from a first end 16 to a second end 18. Exemplary vessel housing 14 includes an upper section 20 (e.g., large diameter cylindrical upper section 20) that is sized to provide volume capacity to receive an instantaneous surge volume of input feed/flow 11, such as may result from a filter backwash operation. In exemplary embodiments, the upper section 20 by design has a larger volume than the volume of the filter vessel utilized in the filter backwash operation, and upper section 20 has sufficient volume capacity to accept the surge flow 11 of slurry (liquid and solids) from the filter utilized in the filter backwash operation. The upper section 20 can be provided with one or more drain nozzles at various elevations to allow decanting of liquid from the upper section 20 (e.g., after solids have settled).

A filter backwash (e.g., such as from a Mott LSI filter) can require an instantaneous high flow surge of liquid during the backwash operation to effectively remove the collected filter cake solids from the filter media (e.g., porous metal candle for Mott LSI filter). The backwash surge flow 11 can be created by pressurizing the filter with gas to create a pressure drop from the filter to the backwash receiver assembly 10, and then opening a discharge valve on a process line that is connected from the filter to the backwash receiver assembly 10 (e.g., to thereby allow flow 11 to enter assembly 10 via inlets 12).

The exemplary middle section 22 of vessel housing 14 extends from a first interior position 21 to a second interior position 23. In general, the first interior position 21 is positioned proximal to the bottom end of the upper section 20, and the second interior position 23 is positioned proximal to the top end of the lower section 24 of vessel housing 14.

Exemplary middle section 22 includes a tapered cone shape that extends and tapers from the first interior position 21 to the second interior position 23. The tapered cone shape of middle section 22 allows for collection and gravity settling of the solids from the slurry 11. The slope of the tapered cone shape of middle section 22 allows for settling solids to move though the liquid to the lower section 24 (e.g., lower collection section 24). In certain embodiments, the slope of the tapered cone shape of middle section 22 allows "wet cake" to move to the lower collection section 24 (e.g., without settling of solids from liquid). The middle section 22 can be provided with one or more drain nozzles 26 at various elevations of middle section 22 (e.g., to allow decanting of liquid from the middle section 22 after solids have settled).

The exemplary lower section 24 (e.g., lower collection section 24) of vessel housing 14 takes the form of a cylindrical vessel section 24 (e.g., the diameter of section 24 is smaller than the diameter of sections 20 and 22) that allows for collection of the settled solids from flow 11, and provides for delineation of the solids-liquid interface. The lower section 24 can be provided with one or more drain nozzles 26 at various elevations of lower section 24 (e.g., to allow decanting of liquid from the lower section 24 after solids have settled).

In certain embodiments and as shown in FIG. 3, the assembly 10" can incorporate one or more insert/barrier members 28a, 28b (e.g., pipe members 28a, 28b, disc members 28a, 28b, spool members 28a, 28b, etc.) that attach or mount to a respective drain nozzle 26. Each insert/barrier member 28a, 28b can include a respective porous media section 30a, 30b.

The porous media section 30a, 30b (and porous media section 30 of FIG. 2, discussed below) can be fabricated from several types of porous materials including, but not limited to: porous metal, polymeric membranes, foams, fibrous materials, polymers, ceramics, and/or glass. The porous metal can be materials from several metal alloys including, but not limited to nickel, cobalt, iron, copper, aluminum, palladium, titanium, tungsten, platinum, silver, gold, and alloys and oxides thereof including stainless steels and nickel-based steels such as Hastelloy® (Haynes Stellite Company, Kokomo, Indiana).

The mean pore size of the porous media section 30, 30a, 30b can be as low as 0.1 microns and go as high as 100 microns (e.g., depending on the flow conditions, temperature, and/or fluid viscosities).

The insert or barrier members 28a, 28b can be utilized to prevent or minimize solids from exiting the vessel housing 14 through the drain nozzles 26 with the decanted liquid. The insert members 28a, 28b can be utilized to allow for dewetting of the settled solids by gas purging (e.g., air, nitrogen or other process gas, heated or unheated) through the settled solids and through the porous media section 30a, 30b to the respective drain nozzles 26. Each porous media section 30a, 30b can prevent solids from exiting the vessel housing 14 with the purge gas and dewetted liquid (e.g., prevent the solids from exiting the housing 14, while the purge gas and dewetted liquid exits the housing 14 via nozzles 26). An exemplary feature of the insert or barrier members 28a, 28b is that they may be removed from the backwash receiver assembly 10", as may be necessary on occasion, for cleaning or replacement.

As shown in FIG. 3, the porous media section 30a, 30b of the mounted insert member 28a, 28b may or may not be inserted within the housing 14. For example and in certain embodiments, at least a portion of the porous media section 30a of the mounted insert member 28a may be inserted within the middle section 22 of housing 14. In another example and in certain embodiments, the porous media section 30b of the mounted insert member 28b may not be inserted within the lower section 24 of housing 14, and the porous media section 30b can be flush with the wall of the lower section 24; the flush alignment of the porous media section 30b with the wall of the lower section 24 provides that the porous media insert member 28b does not interfere with gravity settling or discharge of the solids. It is noted that some drain nozzles 26 can have insert members 28a, 28b mounted thereto, while other drain nozzles 26 do not have insert members 28a, 28b mounted thereto. In some embodiments, each drain nozzle 26 has an insert member 28a, 28b mounted thereto, although the present disclosure is not limited to such embodiments.

In certain embodiments and as shown in FIG. 2, the assembly 10' can incorporate one or more internal surfaces/wall sections 32 of vessel housing 14 having a porous media section 30 (e.g., in the design of the middle section 22 and/or the lower section 24). As shown in FIG. 2, the middle section 22 can include at least one internal wall section 32, with the internal wall section 32 of middle section 22 having one or more porous media sections 30 (e.g., the porous media section 30 of internal wall section 32 can be continuous or non-continuous around internal wall section 32 of middle section 22).

As shown in FIG. 2, the lower section 24 can include at least one internal wall section 32, with the internal wall section 32 of lower section 24 having one or more porous media sections 30 (e.g., the porous media section 30 of internal wall section 32 can be continuous or non-continuous around internal wall section 32 of lower section 24).

The porous media section 30 of each internal wall section 32 can provide a barrier between the internal area of the vessel housing 14 and the respective drain nozzles 26, and can function to prevent (or minimize) solids from exiting the vessel housing 14 through the drain nozzles 26 with the decanted liquid. The porous media section 30 of each internal wall section 32 can be utilized to allow for dewetting of the settled solids by gas purging (e.g., air, nitrogen or other process gas, heated or unheated) through the settled solids and through the porous media section 30 to the respective drain nozzles 26. The porous media section 30 of each internal wall section 32 can prevent solids from exiting the vessel housing 14 with the purge gas and dewetted liquid (e.g., prevent the solids from exiting the housing 14, while the purge gas and dewetted liquid exits the housing 14 via nozzles 26).

A main difference between use of porous insert members 28a, 28b versus the porous wall sections 32 is that the use of the porous insert members 28a, 28b allow for removal of the insert members 28a, 28b for cleaning or replacement. Process flexibility is provided since different insert members 28a, 28b can be installed for use with different feed slurries 11.

The porous media wall sections 32 (e.g., welded in place) can be a permanent part of the vessel housing 14 design. In either case (porous insert member 28a, 28b or porous wall section 32), a cleaning operation with reverse process flow of liquid or gas (e.g., with proper valving on the decant line) could be performed to clean the porous member/section 28a/b, 32 in situ.

The decanting backwash receiver assemblies 10, 10', 10" can provide for slurry surge flow 11 collection, solids settling, liquid decanting, solids dewetting, and solids discharge without the addition of agitators, scrapers, rotating parts, or other mechanical devices inserted into the vessel housing 14.

The decanting backwash receiver assemblies 10, 10', 10" can be mated to a slide gate valve, sized to match the diameter of the lower section 24, to allow unrestricted gravity discharge of the solids from the lower section 24 (e.g., via outlet 34 of the lower section 24) to a container (e.g., drum, cart, tote, hopper, etc.).

The decanting backwash receiver assemblies 10, 10', 10" can provide for solids (e.g., wet cake, dewetted cake) discharge in an automated fashion without scraper devices or manual labor to disassemble components (e.g., vessel housing 14 components).

The decanting backwash receiver assemblies 10, 10', 10" can be provided with level measurement instruments and/or weight instruments to monitor the level or weight of slurry, liquid, and/or solids (e.g., in the vessel housing 14).

The decanting backwash receiver assemblies 10, 10', 10" can incorporate a bin or cone vibrator to assist in discharge of solids from the vessel housing 14.

The decanting backwash receiver assemblies 10, 10', 10" can incorporate a vacuum source to use vacuum pressure in the vessel housing 14 to evaporate liquid from the settled solids.

The vessel housing 14 of the decanting backwash receiver assemblies 10, 10', 10" can be designed as an ASME pressure vessel housing 14 capable of operation at elevated temperatures and elevated pressures or at vacuum conditions.

The decanting backwash receiver assemblies 10, 10', 10" can be designed and sized to operate in coordination with a filter system. A preferred operation can have substantially the entire volume of settled solids collect in the lower collection section 24. In exemplary embodiments, this can provide for the optimum or improved solids-liquid interface delineation and can provide for the greatest or highest percent removal of decanted liquid. The filter operating filtration cycle duration may be adjusted to provide a backwash 11 with a solids loading content that would settle to the lower collection section 24.

The exemplary decanting backwash receiver assemblies 10, 10', 10" are able to collect a filter backwash flow 11 that includes various ranges of solids loading (e.g., from 0 to 100 wt % solids, based on the total weight of flow 11). It is noted that a typical filter slurry backwash flow 11 is expected to include from 5 wt % to 30 wt % solids, based on the total weight of flow 11. After solids settling, the liquid layer above the solids may be decanted and recovered for recycle back to the filtration process. In other non-limiting examples, a typical "wet cake" filter backwash flow 11 can include from 40 wt % to 80 wt % solids, based on the total weight of flow 11.

Exemplary decanting backwash receiver assemblies 10, 10', 10" can be incorporated into a filter system for the separation of palladium from fatty acids.

Exemplary decanting backwash receiver assemblies 10, 10', 10" are able to incorporate slurry surge flow 11 collection, solids settling, liquid decanting, solids dewetting, and solids discharge into a single assembly 10, 10', 10".

As noted, exemplary decanting backwash receiver assemblies 10, 10', 10" are able to collect a filter backwash flow 11 that includes any range of solids loading (e.g., from 0 to 100 wt % solids, or from 0 to 100 wt % liquid, based on the total weight of flow 11).

As discussed, there are no agitators, scrapers, motors, or other rotating or mechanical equipment necessary to operate exemplary decanting backwash receiver assemblies 10, 10', 10" of the present disclosure. It is noted that accessory mechanical equipment, such as an insert hopper agitator assembly or external pneumatic vibrator could be added as accessories to assist with the solids removal from the decanting backwash receiver assemblies 10, 10', 10".

Exemplary decanting backwash receiver assemblies 10, 10', 10" can be designed to promote settling of high density solids allowing for recovery of more liquid (end product) than conventional designs.

Exemplary decanting backwash receiver assemblies 10, 10', 10" can allow for the concentration of recovery solids, thereby reducing storage volume, reducing reclamation costs and/or reducing handling/transport costs.

Exemplary decanting backwash receiver assemblies 10, 10', 10" can be specifically sized to decant one filter cycle output from a filter (e.g., a custom-sized Mott filter). For example, the tapered cone shape of middle section 22 can have one or more intermediate nozzles 26 (e.g., two intermediate nozzles 26), which thereby allow for decanting and recycle of approximately 90% of the original backwash flow 11 volume. The remaining approximately 10% (assumed to be 50% solids for reclamation and 50% retained liquid) can be held in the specifically sized lower section 24 (e.g., specifically sized straight pipe section 24 at the bottom of the vessel housing 14) where settled solids are discharged into a drum or tote or the like.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A decanting backwash receiver assembly comprising:
    a vessel housing that extends from a first end to a second end, the vessel housing having an upper section, a middle section and a lower section;
    one or more inlets associated with the vessel housing, each inlet configured to accept and introduce an input feed to the vessel housing;
    wherein the upper section is sized to provide volume capacity to receive an instantaneous surge volume of input feed from a filter backwash operation;
    wherein the middle section of the vessel housing extends from a first interior position to a second interior position, the first interior position positioned proximal to a bottom end of the upper section, and the second interior position positioned proximal to a top end of the lower section of the vessel housing;
    wherein the middle section includes a tapered cone shape that extends and tapers from the first interior position to the second interior position, the tapered cone shape of middle section thereby allowing for collection and gravity settling of solids from the input feed; and
    wherein the lower section allows for collection of settled solids from the input feed;
    wherein the middle section includes one or more drain nozzles, a first drain nozzle of the middle section including a middle section insert member, the middle section insert member having a porous media section, wherein the porous media section of the middle section insert member prevents or minimizes solids from exiting the vessel housing through the first drain nozzle of the middle section; and wherein at least a portion of the porous media section of the middle section insert member mounted to the middle section is inserted within the middle section of the vessel housing.

2. The assembly of claim 1, wherein the upper section is a cylindrical upper section, and wherein the outer diameter of the upper section is larger than the outer diameter of the lower section.

3. The assembly of claim 1, wherein the upper section has a larger volume than the volume of a filter vessel utilized in the filter backwash operation, and the upper section has sufficient volume capacity to accept the instantaneous surge volume of input feed from the filter utilized in the filter backwash operation.

4. The assembly of claim 1, wherein the surge volume of input feed is created by pressurizing a filter vessel utilized in the filter backwash operation with gas to create a pressure drop from the filter vessel to the vessel housing, and then opening a discharge valve on a process line that is connected from the filter vessel to the vessel housing.

5. The assembly of claim 1, wherein the input feed is a solids and liquid mixture.

6. The assembly of claim 1, wherein the input feed is a wet cake filter backwash surge flow.

7. The assembly of claim 1, wherein the lower section is a cylindrical vessel section, and wherein the lower section provides for delineation of a solids-liquid interface.

8. The assembly of claim 1, wherein the lower section includes one or more drain nozzles.

9. The assembly of claim 8, wherein a first drain nozzle of the lower section includes a lower section insert member, the lower section insert member having a porous media section.

10. The assembly of claim 9, wherein the porous media section of the lower section insert member prevents or minimizes solids from exiting the vessel housing through the first drain nozzle of the lower section.

11. The assembly of claim 8, wherein the middle section includes an internal wall section, the internal wall section of the middle section having a porous media section, and
wherein the lower section includes an internal wall section, the internal wall section of the lower section having a porous media section.

12. The assembly of claim 11, wherein the porous media section of the internal wall section of the middle section prevents or minimizes solids from exiting the vessel housing through a drain nozzle of the middle section, and the porous media section of the internal wall section of the lower section prevents or minimizes solids from exiting the vessel housing through a drain nozzle of the lower section.

13. The assembly of claim 1, wherein the lower section allows for unrestricted gravity discharge of solids from the lower section.

14. The assembly of claim 1, wherein the vessel housing is pressure vessel housing capable of operation at elevated temperatures and elevated pressures or at vacuum conditions.

15. The assembly of claim 1, wherein the input feed has a solids loading from greater than 0 to 100 wt % solids, based on the total weight of the input feed.

16. The assembly of claim 1, wherein the input feed has a solids loading from 5 to 40 wt % solids, based on the total weight of the input feed.

17. The assembly of claim 1, wherein the input feed has a solids loading from 40 to 80 wt % solids, based on the total weight of the input feed.

18. A method for operating a decanting backwash receiver assembly comprising:
providing a vessel housing that extends from a first end to a second end, the vessel housing having an upper section, a middle section, a lower section, and one or more inlets,
introducing an input feed to the upper section of the vessel housing via the one or more inlets, the input feed an instantaneous surge volume from a filter backwash operation;
wherein the middle section of the vessel housing extends from a first interior position to a second interior position, the first interior position positioned proximal to a bottom end of the upper section, and the second interior position positioned proximal to a top end of the lower section of the vessel housing;
wherein the middle section includes a tapered cone shape that extends and tapers from the first interior position to the second interior position, the tapered cone shape of middle section thereby allowing for collection and gravity settling of solids from the input feed; and
wherein the lower section allows for collection of settled solids from the input feed;
wherein the middle section includes one or more drain nozzles, a first drain nozzle of the middle section including a middle section insert member, the middle section insert member having a porous media section, wherein the porous media section of the middle section insert member prevents or minimizes solids from exiting the vessel housing through the first drain nozzle of the middle section; and
wherein at least a portion of the porous media section of the middle section insert member mounted to the middle section is inserted within the middle section of the vessel housing.

19. The method of claim 18, wherein the upper section has a larger volume than the volume of a filter vessel utilized in the filter backwash operation, and the upper section has sufficient volume capacity to accept the instantaneous surge volume of input feed from the filter utilized in the filter backwash operation.

20. The method of claim 18, wherein the surge volume of input feed is created by pressurizing a filter vessel utilized in the filter backwash operation with gas to create a pressure drop from the filter vessel to the vessel housing, and then opening a discharge valve on a process line that is connected from the filter vessel to the vessel housing.

* * * * *